United States Patent [19]

Claes

[11] Patent Number: 6,082,647
[45] Date of Patent: Jul. 4, 2000

[54] MOUNTED CHOPPER IN A COMBINE HARVESTER

[75] Inventor: Ulrich Claes, Rodinghausen, Germany

[73] Assignee: Claas Selbstfahrende Erntemaschinen GmbH, Harsewinkel, Germany

[21] Appl. No.: 09/195,979

[22] Filed: Nov. 19, 1998

[30] Foreign Application Priority Data

Nov. 20, 1997 [DE] Germany ............................ 197 51 368

[51] Int. Cl.⁷ .................................................. A01D 34/07
[52] U.S. Cl. ................................ 241/186.3; 241/101.742; 241/605; 56/79; 56/192
[58] Field of Search ............................ 241/243, 101.742, 241/186.3, 605, 285.3; 56/71, 79, 83, 192, 193, 504, 505

[56] References Cited

U.S. PATENT DOCUMENTS

| | | | |
|---|---|---|---|
| 2,554,669 | 5/1951 | Elofson ........................................ | 275/3 |
| 2,626,159 | 1/1953 | Thompson .................................. | 275/3 |
| 2,708,582 | 5/1955 | Adams ......................................... | 275/3 |
| 2,842,175 | 7/1958 | Thompson .................................. | 146/123 |
| 3,403,863 | 10/1968 | Veech .......................................... | 239/272 |
| 3,827,642 | 8/1974 | Sageman .................................... | 241/101.7 |
| 3,943,688 | 3/1976 | Billings ..................................... | 56/328 R |
| 4,149,543 | 4/1979 | Decoene et al. .......................... | 130/23 |
| 4,526,180 | 7/1985 | Scott et al. ................................ | 130/27 R |
| 4,532,941 | 8/1985 | Gauthier .................................... | 130/27 R |
| 4,646,757 | 3/1987 | Schmitt et al. .......................... | 130/27 R |
| 4,735,216 | 4/1988 | Scott et al. ................................ | 130/27 R |
| 5,210,999 | 5/1993 | Cosimati .................................... | 56/327.1 |

FOREIGN PATENT DOCUMENTS

| | | |
|---|---|---|
| 0 631 717 A1 | 5/1994 | European Pat. Off. . |
| 28 04 208 A1 | 8/1979 | Germany . |
| 31 22 920 A1 | 5/1982 | Germany . |
| 42 18 235 A1 | 12/1993 | Germany . |
| 43 21 905 A1 | 1/1998 | Germany . |
| 2 165 732 | 4/1986 | United Kingdom . |

*Primary Examiner*—Joseph J. Hail, III
*Assistant Examiner*—William Hong
*Attorney, Agent, or Firm*—Husch & Eppenberger, LLC; Robert E. Muir, Esq.

[57] ABSTRACT

A combine harvester has a mounted chopper with a wide-distributor discharge, designed such that the need for impeller blowers for distributing the chopped material across the entire cutting width of the combine harvester is eliminated.

In the mounted chopper according to the invention, the latter consists of the two chopper units whose shafts carrying the chopper blades are at an obtuse angle to each other and cooperate with corresponding counterblades. Each chopper unit is equipped with an input funnel so that the straw is chopped completely. To distribute the chopped material, each chopper unit is equipped with an ejection fitting, increasing in cross-section towards the rear end.

The mounted chopper is particularly suitable for combine harvesters with a wide cutting width.

10 Claims, 4 Drawing Sheets

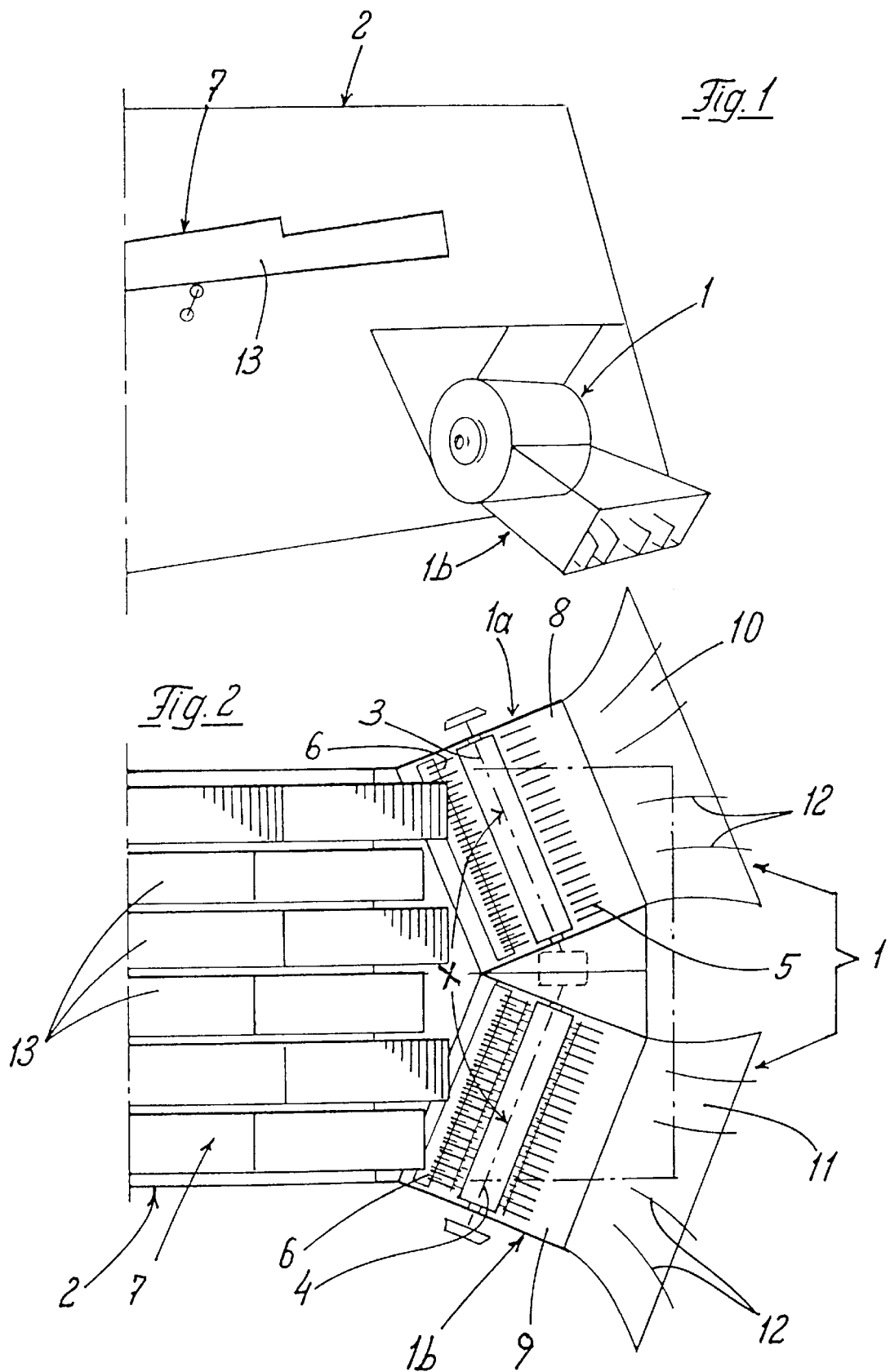

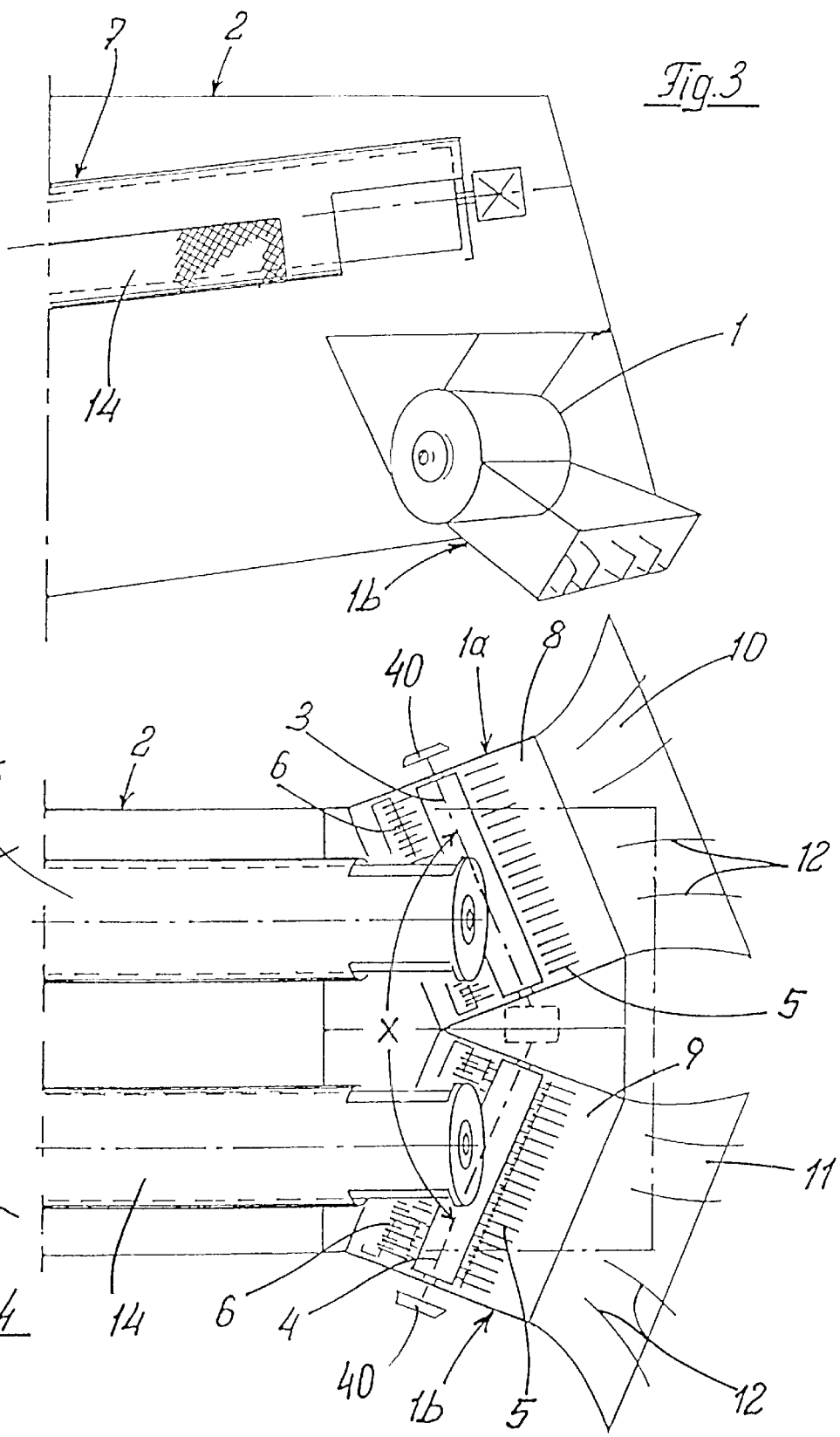

MOUNTED CHOPPER IN A COMBINE HARVESTER

BACKGROUND OF THE INVENTION

The present invention relates generally to agricultural machinery and, more particularly, to improvements to combine harvesters for agricultural crops.

The invention concerns a combine harvester having a mounted chopper which essentially comprises rotationally driven chopper blades and stationary counterblades cooperating therewith and which is equipped with a wide-distributor discharge for the chopped material.

The mounted chopper of a combine harvester is normally designed so that i) the mounted chopper can be operated to chop straw, or ii) it can be put into a position out of operation to deposit the straw in swathes. If the straw is chopped, a wide-distributor discharge is necessary because the cutting widths of combine harvesters can be up to 9 m. When the straw is chopped, the chopped material must be distributed over the field as evenly as possible across the entire cutting width of the combine harvester.

For this purpose German Patent 43 21 905 A1 proposes that the chopped material runs into two transfer funnels in order to introduce it into two impeller blowers. These impeller blowers are equipped with rotors which can be driven in rotation about vertical axes. Although the rotors are driven at relatively high speeds, this relatively elaborate measure is nonetheless insufficient. To try to ensure even discharge of the chopped material, the two ejection fittings are pivoted through an adjustable pivot angle. Of course it can be assumed that distribution is sufficiently even, however the structural elaborateness is extremely high. Moreover, a high drive output is necessary due to the high speed of the rotors for the impeller blowers.

A mounted chopper which consists of two chopper units is known from German Patent 42 18 235 A1. There the shafts carrying the chopper blades are arranged in the direction of travel of the combine harvester, so that the chopped material is ejected laterally, i.e. at an angle to the direction of travel. In another embodiment, the shaft carrying the chopper blades is arranged perpendicularly to the longitudinal axis or the direction of travel of the combine harvester. However, the direction of rotation is selected such that the separated chopped material is deposited between the rear wheels and the rear end of the combine harvester. In a modified embodiment the chopped material passes onto two impeller plates, as a result of which it is likewise discharged only laterally. In these embodiments it is impossible to have even distribution of the chopped material in combine harvesters with extremely wide cutting widths.

Starting from a state of the art known from German Patent 43 21 905 A1, it is an object of the invention to provide a mounted chopper whereby impeller blowers or like distributing means can be dispensed with.

Another object of the present invention is to provide an apparatus by which the chopped material is distributed evenly even with the widest cutting width of a combine harvester.

SUMMARY OF THE INVENTION

In accordance with the present invention there is provided a combine harvester having a grain separator; and two chopper units mounted behind the grain separator; each chopper unit including a shaft, rotationally driven chopper blades mounted on the shaft, stationary counterblades cooperating with the driven chopper blades to chop material, a wide-distributor discharge for the chopped material; and means for mounting the shafts crosswise of the combine harvest and at an obtuse angle, so that at least two wide streams of chopped material are discharged.

In accordance with an embodiment of the present invention, the distributing means with driven rotors can be dispensed with because the two streams of chopped material can be distributed into the two regions laterally adjacent to the combine harvester up to the full cutting width rather than in the direct region behind the combine harvester. In contrast, the previously known state of the art required formation of the two streams of chopped material by specially designed mounted choppers rather than by additional units for wide-distributor discharge. Mounted choppers with wide-distributor discharge are not significantly more structurally elaborate than ordinary mounted choppers because the synchronous driving of the rotating shafts for the chopper blades, which are at an obtuse angle, can be driven by corresponding drive elements.

The angle formed by the two shafts carrying the chopper blades with the two chopper units is less than 180°. This angle is the angle which lies on the side facing the grain separator, i.e. as seen in the direction of flow of the material to be chopped, and in front of the two chopper devices. This angle formed by the chopper units varies and is adjustable as combine harvesters are supplied with different cutting widths. In order to ensure that all the straw also passes into the chopper units, each chopper unit is equipped with an input funnel. For even distribution, each chopper unit is equipped with an ejection fitting. This ejection fitting widens in cross-section towards the rear end. These ejection fittings are also at an angle to each other. Due to the widening of cross-section towards the rear region, the exiting chopped material is distributed in the middle region of the cutting width of a combine harvester. The drive of both shafts for the chopper blades are versatile, hence each chopper unit can be driven by its own drive. Furthermore, it is possible for only one chopper unit to be driven by the main drive of the combine harvester while the other is coupled to it for driving purposes. Baffle plates are arranged within the ejection fittings to guide the stream of chopped material.

BRIEF DESCRIPTION OF THE DRAWINGS

With the aid of the attached drawings the invention will be described in more detail. They show:

FIG. 1 shows the rear region of a combine harvester equipped with a vibrator and a mounted chopper according to the invention in a side view.

FIG. 2 shows the rear region of a combine harvester equipped with a vibrator and a mounted chopper according to the invention in a top view.

FIG. 3 shows the rear region of a combine harvester equipped with one or two dividing rotors and a mounted chopper according to the invention in a side view.

FIG. 4 shows the rear region of a combine harvester according to FIG. 3 equipped with two dividing rotors and a mounted chopper according to the invention in a top view.

DETAILED DESCRIPTION

Figure 5:
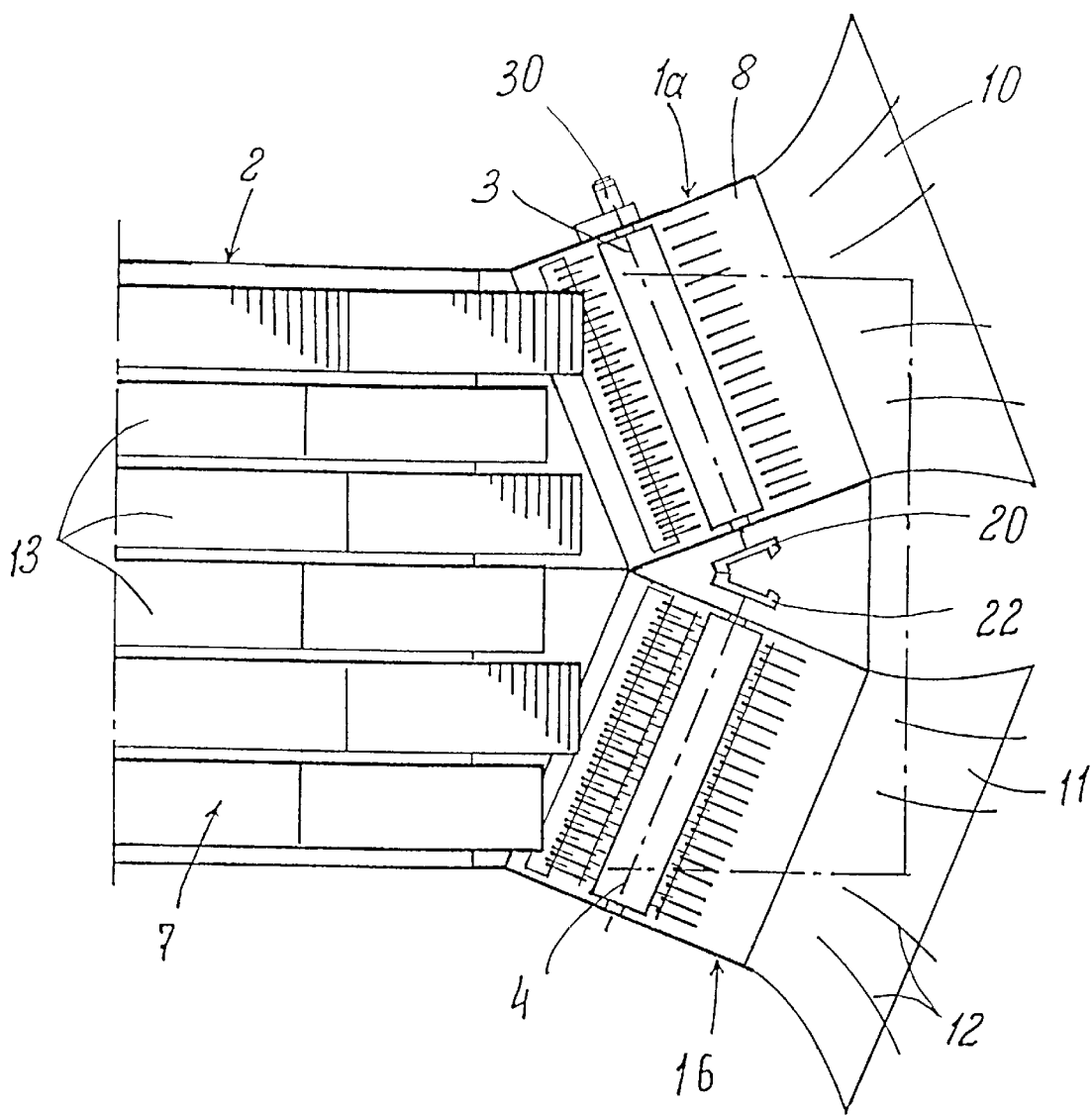
FIG. 5 illustrates a means for making the shafts adjustable.

The mounted choppers 1 shown schematically in FIGS. 1 to 4 as part of a combine harvester 2 shown as an indication, to form a wide-distributor discharge consisting of two chopper units 1a and 1b which are to be regarded as the same in construction. Each chopper unit 1a, 1b is equipped with a rotationally drivable shaft 3, 4, upon which the chopper blades 5 are mounted rotatably or non-rotatably. These chopper blades 5 cooperate with the shown stationary counterblades 6 in order to chop the straw sufficiently. For this purpose, the chopper blades 5 and the counterblades 6 are at relatively short, equally spaced intervals from each other, but are offset by half each interval. In particular, FIGS. 2 and 4 show the two shafts 3, 4 at an obtuse angle to each other less than 180°. In the embodiment shown, these two shafts 3,4 are at an angle of about 135°. This angle is the angle which lies in front of the two shafts, in the direction of flow of the straw, i.e. facing towards the grain separator 7. This angle can be adjusted depending on the cutting width of the combine harvester, provided the drive or drives for the two shafts 3, 4 are designed accordingly. An input funnel 8,9 is provided in order to ensure that the material is completely chopped by the two chopper units 1a, 1b, between the output end of the grain separator 7 and the two chopper units 1a, 1b. Each chopper unit 1a, 1b is equipped with an ejection fitting 10, 11 which increases in cross-section towards the rear free end, so that the emerging stream of chopped material is distributed evenly in across half the cutting width of the combine harvester. In addition, curved baffle plates 12 are mounted within the two ejection fittings for this purpose.

Figure 6:
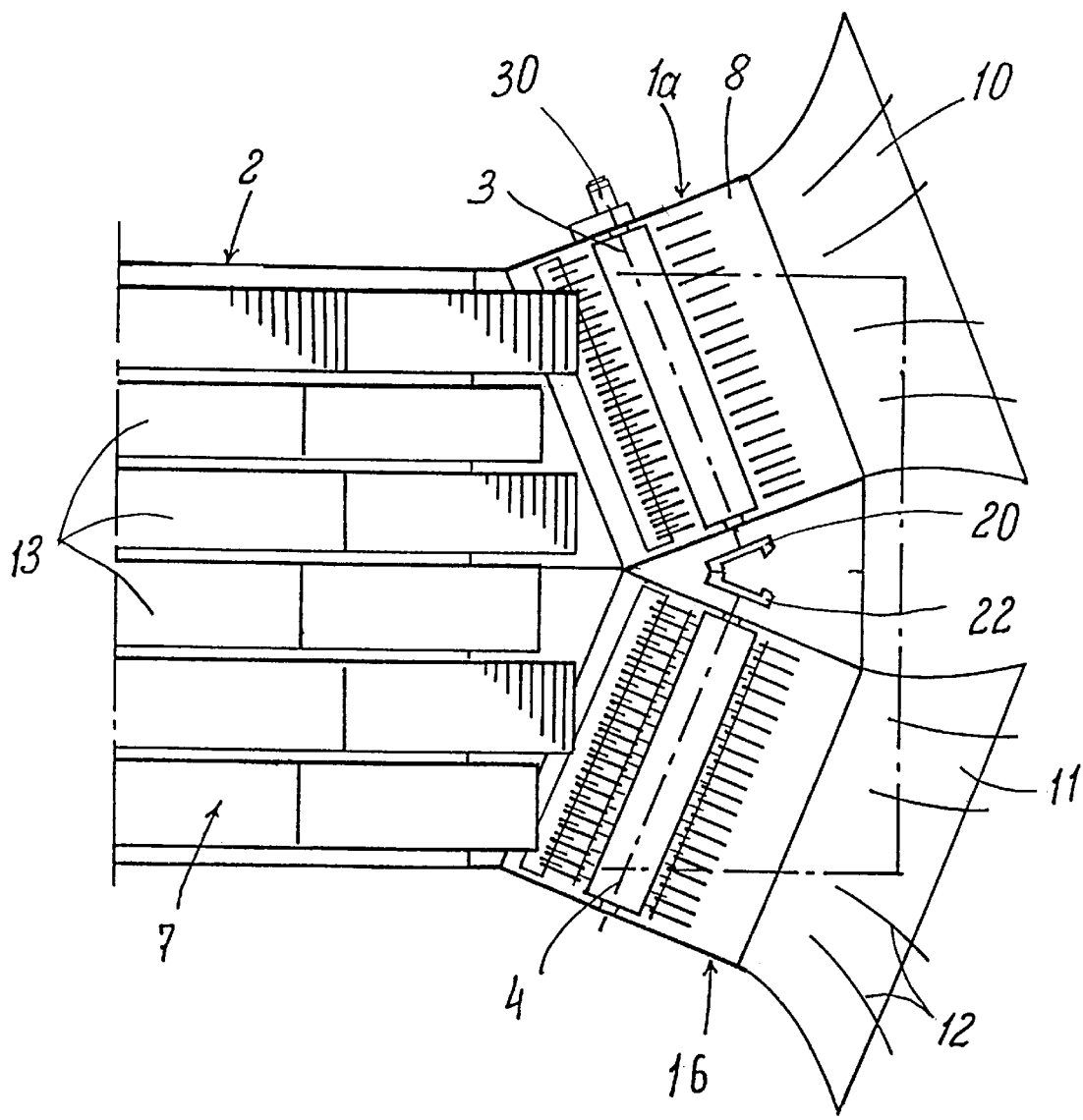
FIG. 6 illustrates the use of the crown gears for driving the shafts.

The shafts 3, 4 can be driven in a variety of ways. Hence it is possible for each shaft 3, 4 to be driven by its own drive 40 from the main drive of the combine harvester, as shown in FIGS. 2, 4 and 5. For this purpose, non-rotating, keyed crown gears are positioned onto the two outer ends of the shafts 3, 4 facing away from each other. The two inner end regions are then mounted accordingly. By contrast with the embodiment shown, the two inner end regions of the shafts 3, 4 could also be coupled together for driving purposes, for example by corresponding crown gears 20 and 22 as shown in FIG 6. A drive 30 drives the shaft 3, with the crown gears 20 and 22 intermeshed to drive the shaft 4. Either shaft 3 or 4 could be driven.

The mounted choppers of the two embodiments do not differ in operation. Adaptation to the different grain separators 7 may be necessary. In the embodiments according to FIGS. 1 and 2, the grain separator consists of vibrators 13, which are known in combine harvester construction. In the embodiment according to FIGS. 3 and 4, the grain separator 7 consists of two counter-rotating dividing rotors 14, 15 whose axes of rotation extend in the direction of flow of the crop material or in the direction of travel. In a manner not shown, the dividing rotors 14, 15 can also be transverse to the direction of travel of the combine harvester or parallel to and spaced apart from the front axle.

Other objects, features and advantages will be apparent to those skilled in the art. While preferred embodiments of the present invention have been illustrated and described, this has been by way of illustration and the invention should not be limited except as required by the scope of the appended claims.

I claim:

1. A combine harvester having a grain separator; two chopper units; means for mounting the chopper units side by side behind the grain separator; each chopper unit including a shaft, rotationally driven chopper blades mounted on the shaft, stationary counterblades cooperating with the driven chopper blades to chop material, a wide-distributor discharge for the chopped material; and means for mounting the shafts crosswise of the combine harvester and at an obtuse angle, so that at least two wide streams of chopped material are discharged.

2. A combine harvester according to claim 1, wherein each chopper unit is each equipped with an input funnel.

3. A combine harvester according to claim 1, wherein said chopper units each have a diverging ejection fitting which increases in cross-section toward the rear of the combine harvester.

4. A combine harvester according to claim 3, including a plurality of baffle plates arranged within each ejection fitting for directing the flow of the chopped material.

5. A combine harvester according to claim 1, including a drive for each chopper unit shaft.

6. A combine harvester according to claim 1, including means coupling the shafts of the chopper units for driving purposes, and means providing a driving connection between one of the chopper units and the main drive of the combine harvester.

7. A mounted chopper arrangement for a combine harvester having a grain separator, the arrangement comprising two chopper units mounted behind the grain separator; each chopper unit including a drive shaft, rotationally driven chopper blades mounted on the shaft, stationary counterblades cooperating with the driven chopper blades to chop material, a discharge for the chopped material; and means for mounting the shafts crosswise of the combine harvester and at a selected obtuse angle, so that at least two streams of chopped material are discharged.

8. A mounted chopper arrangement in accordance with claim 7 wherein the obtuse angle is about 135 degrees.

9. A mounted chopper arrangement in accordance with claim 7 wherein the chopper units are mounted closely adjacent each other at a rear portion of the combine harvester.

10. A combine harvester having a main drive; a grain separator; two chopper units for chopping material; means for mounting the chopper units in a side by side relationship behind the grain separator; each chopper unit including a shaft, rotationally driven chopper blades mounted on the shaft, stationary counterblades cooperating with the driven chopper blades to chop material, and a wide-distributor discharge for the chopped material; each chopper unit having an input funnel, a diverging ejection fitting which increases in cross-section toward the rear of the combine harvester, and a plurality of baffle plates arranged within each ejection fitting for directing flow of the chopped material; drive means for driving the chopper unit shafts and including means providing a driving connection between one of the chopper unit shafts and a main drive of the combine harvester; and means for mounting the shafts crosswise of the combine harvest and at an obtuse angle, so that at least two wide streams of chopped material may be discharged.

* * * * *